Feb. 16, 1932.   G. C. ROWDEN   1,845,723
PROCESS FOR TREATING PETROLEUM OILS
Filed April 15, 1929
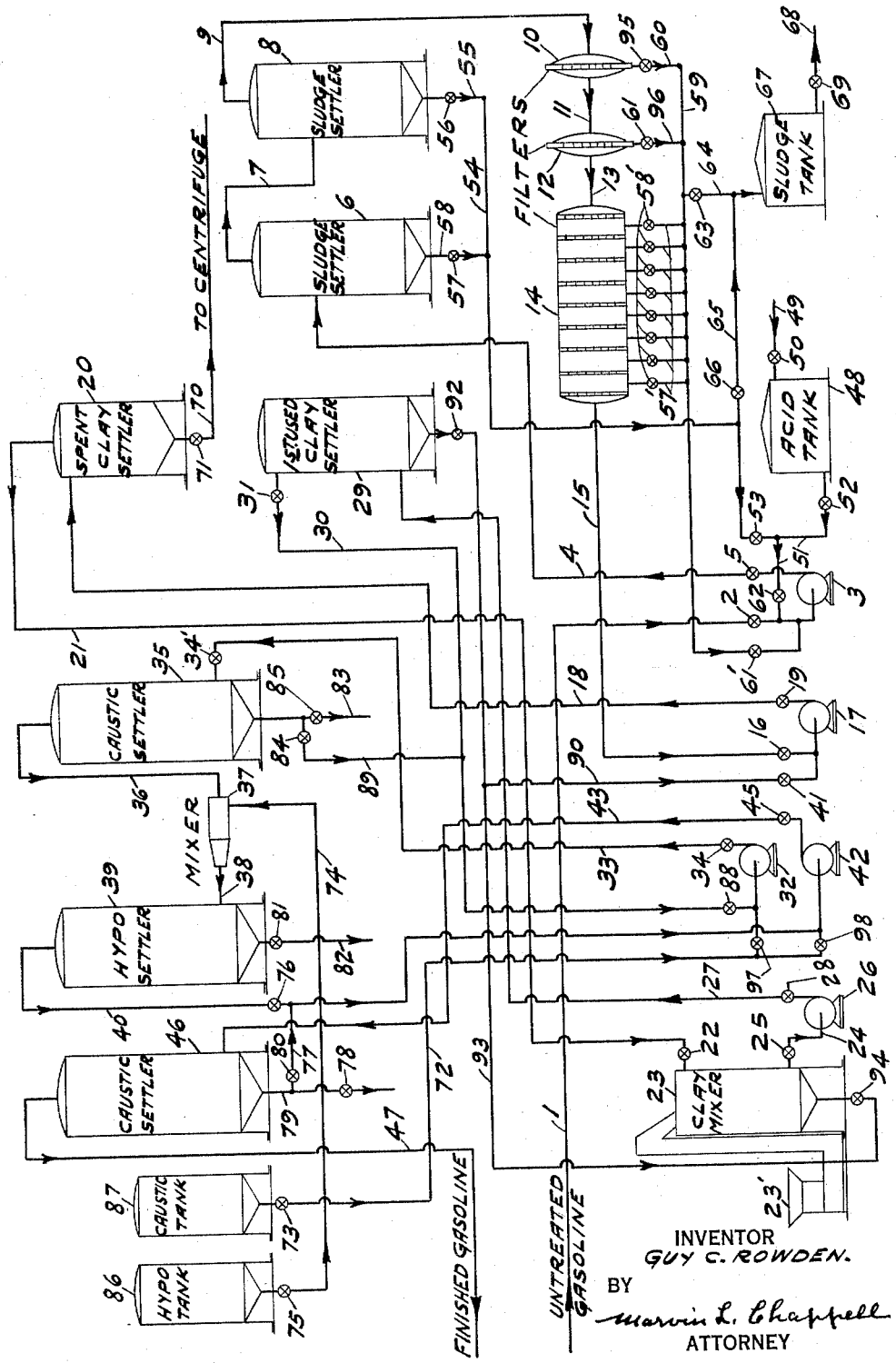
INVENTOR
*GUY C. ROWDEN.*
BY
*Marvin L. Chappell*
ATTORNEY Patented Feb. 16, 1932

1,845,723

UNITED STATES PATENT OFFICE

GUY C. ROWDEN, OF WATSON, CALIFORNIA

PROCESS FOR TREATING PETROLEUM OILS

Application filed April 15, 1929. Serial No. 355,316.

This invention relates to a process for treating petroleum oils, and while not necessarily confined thereto, it more specifically refers to a method for the economical purification of gasoline stocks derived from crude petroleum oils, by distillation, or gasoline stocks produced by the cracking of hydrocarbon oils, such as petroleum oils.

One of the principal objects of this invention is to accomplish an economical purification of gasoline stocks by a continuous sequence of operations.

Another object of the invention is to produce a method for the economical purification of gasoline stock by the removal of unstable, unsaturated hydrocarbons, unstable sulphur bearing hydrocarbons, and to render the gasoline "sweet" to the "doctor test", without any substantial removal or loss of the stable, unsaturated hydrocarbons.

Another object of the invention is to intermittently utilize the acid reaction products produced by the treatment of gasoline stock with sulphuric acid to treat untreated gasoline stock.

Another object of the invention is to utilize a part of the spent clarifying and decolorizing clay employed for clarifying and decolorizing the acid treated and neutralized gasoline stock, to remove sulphuric acid reaction products from acid-treating gasoline stock.

Another object of the invention is to purify gasoline stock with a minimum consumption of the purifying or refining agents.

Various other objects and advantages of the present invention will be apparent from the description of the preferred form or example of the process and apparatus embodying the invention.

The drawing represents a diagrammatic view of the apparatus in which the parts are in vertical section.

In the drawing, 1 represents a pipe leading to a source of untreated gasoline stock not shown, connected to the inlet side of pump 3 controlled by the valve 2. Pipe 4, controlled by the valve 5 connects the discharge side of pump 3 to sludge settler 6.

48 represents generally a tank for holding the acid to be used in the treatment. Pipe 49 controlled by the valve 50, is connected to tank 48 and leads to a source of sulphuric acid supply not shown. Pipes 51, controlled by the valves 52 and 62, connect the acid tank 48 near the bottom to pipe 1. Pipe 7 connects sludge settler 6 to a second sludge settler 8. Pipe 9 connects the sludge settler 8 to filter 10. Pipe 11 connects filter 10 to filter 12. Pipe 13 connects filter 12 to filter tank 14.

Pipes 57' controlled by valves 58' connect the various sections of the filter tank 14 to pipe 59. Pipe 60, controlled by the valve 95, connects filter 10 to the pipe 59. Pipe 96, controlled by the valve 61, connects the filter 12 to pipe 59. Pipe 59, controlled by the valve 61', is connected to pipe 1 near the inlet side of pump 3.

Pipe 15, controlled by valve 16, connects filter tank 14 to the inlet side of pump 17. Pipe 58, controlled by the valve 57, connects sludge settler 6 to pipe 54. Pipe 55, controlled by valve 56, connects sludge settler 8 to pipe 54. Pipe 54 is connected to the pipe 65. Pipe 65 controlled by valves 66 and 53, connects pipe 64 to pipe 51.

Pipe 64, controlled by the valve 63, connects pipe 59 to sludge tank 67. Pipe 68, controlled by the valve 69, connects the sludge tank 67 near the bottom to a storage not shown.

Pipe 18, controlled by valve 19, connects the discharge side of pump 17 to spent clay settler 20. Pipe 70, controlled by valve 71, connects the spent clay settler 20 to a centrifuge not shown. Pipe 21, controlled by the valve 22, connects the spent clay settler 20 to clay mixer 23. 23' represents generally a clay hopper and elevator for introducing clay into the clay mixer 23.

Pipe 24, controlled by the valve 25, connects the clay mixer 23 to the inlet side of pump 26. Pipe 27, controlled by the valve 28 connects the discharge side of pump 26 to first used clay settler 29.

Pipe 93, controlled by the valves 92 and 94, connects the first used clay settler 29 to clay mixer 23.

A branch pipe 90, controlled by valve 41, connects pipe 93 to the inlet side of pump 17.

Pipe 30, controlled by valves 31 and 88, connects first used clay settler 29, through the pipe 72, to the inlet side of pump 32. Pipe 33, controlled by the valves 34 and 34', connects the discharge side of pump 32 to caustic settler 35. Pipe 83, controlled by the valve 85, connects caustic settler 35 to a waste receiver not shown. Pipe 89, controlled by the valve 84, connects pipe 89 to pipe 30. Pipe 36 connects caustic settler 35 to mixer 37. 86 represents generally a tank for holding a hypochlorite solution such as sodium hypochlorite which may be filled from a supply not shown. Pipe 74, controlled by the valve 75, connects the hypo tank 86 at the bottom to mixer 37. Pipe 38 connects the mixer 37 to hypo settler 39. Pipe 82, controlled by the valve 81, connects the hypo settler 39 at the bottom to a waste receiver not shown. Pipe 40, controlled by valve 76, connects the hypo settler 39 at the top to the inlet side of pump 42.

87 represents generally a tank for holding a water solution of caustic soda or caustic potash which may be filled from a supply not shown. Pipe 72, controlled by the valves 73, 97 and 98, connects the caustic tank 87 at the bottom to the inlet side of pumps 32 and 42. Pipe 43, controlled by the valve 45, connects the discharge side of pump 42 to caustic settler 46.

Pipe 79, controlled by valve 78, connects the caustic settler 46 to a waste receiver not shown. Branch pipe 77, controlled by valve 80, connects pipe 79 to pipe 40.

Pipe 47 connects the caustic settler 46 at the top to a finished gasoline tank not shown.

The preferred process as carried out with the apparatus just described is as follows:

Untreated gasoline stock, at a predetermined rate of speed, is caused to flow through pipe 1, coming from a source not shown under gravity flow or pump pressure, controlled by valve 2. From pipe 1 the gasoline stock passes into the inlet side of pump 3 along with a regulated flow of 66 degree Baumé sulphuric acid coming from the acid tank 48 through pipe 51 which is connected to pipe 1 near the inlet side of pump 3. The rate of flow of the sulphuric acid through pipe 51 is regulated by operating valves 52 and 62 and the quantity of acid employed to treat the gasoline stock may range from as low as 1/8 of one pound to as high as 2 pounds or higher, of sulphuric acid per barrel of gasoline stock to be treated.

The gasoline stock and sulphuric acid passing into pump 3, which is preferably of the centrifugal type, are commingled therein, and discharged through pipe 4 into the sludge settler 6, valve 5 being open.

In sludge settler 6, a portion of the acid reaction products separates and settles to the bottom of settler 6. The acid treated gasoline stock along with that portion of the acid reaction products which did not separate in settler 6, pass through pipe 7 into a second sludge settler 8, wherein another portion of the acid reaction products separates and settles to the bottom of sludge settler 8. From sludge settler 8 the acid treated gasoline stock containing the acid reaction products which did not separate in settlers 6 and 8, passes through pipe 9, filter 10, pipe 11, filter 12, pipe 13 and filter tank 14, wherein a further separation of the acid reaction products along with a small percentage of gasoline stock, is effected.

The acid reaction products, containing gasoline stock, separated by this filtration operation, continuously flow through pipe 59, valves 58' in the pipes 57', valve 61 in the pipe 96, valve 95 in the pipe 60 and valve 61' in the pipe 59, being open. Pipe 59 conducts the separated acid reaction products mixed with the said gasoline stock back into pipe 1, where the same is commingled with the incoming gasoline stock and sulphuric acid and re-cycled, the said acid reaction products being finally separated by gravity in the settlers 6 and 8.

The filters 10, 12 and filter tank 14 contain a filter material such as glass wool held in place by means of frames and clamps and the separation of acid reaction products from the acid treated gasoline stock is effected by agglomeration during the passage therethrough.

From the filter tank 14 the acid treated gasoline stock still containing a small percentage of acid reaction products, passes through pipe 15 and into the inlet side of centrifugal pump 17 and is therein commingled with a portion of the used clarifying and decolorizing clay which is suspended in a sufficient quantity of the gasoline stock under treatment to render the same transportable by pipe and pump means coming from first used clay settler 29 through the pipes 93 and 90, which are controlled by valves 92 and 41. Pipe arrangements are also made so that a portion of this once used clay may be employed along with new clay for the subsequent clarifying and decolorizing operation of the gasoline stock, pipe 93, controlled by valve 94, being connected to clay mixer 23.

Pump 17 discharges the commingled mixture of gasoline and used clay through pipe 18, controlled by valve 19, into spent clay settler 20, wherein the said spent clay and adsorbed acid reaction products are separated from the major portion of the gasoline stock by gravity. From clay settler 20, the spent clay containing the acid reaction products which were not separated by the aforesaid settling and filtration operation suspended in some of the gasoline stock under treatment, passes through the pipe 70, controlled by the valve 71, to a centrifuge not shown, wherein the said gasoline stock is separated by centrifugal force from the used clay and returned to the settler 20 by a pipe and pump means not shown.

From spent clay settler 20 the gasoline stock substantially free from acid reaction products passes through pipe 21, controlled by valve 22, and into clay mixer 23. The clay mixer 23 is connected to a clay hopper and elevator 23', which continuously introduces the required amount of a clarifying and decolorizing clay (200 mesh) into the gasoline stock coming into said clay mixer 23. The amount of the clarifying and decolorizing clay employed ranges approximately from as low as $\frac{1}{10}$ of one pound to as high as 2 pounds per barrel of gasoline stock to be treated.

As heretofore stated, a part of the used clay suspended in a sufficient quantity of gasoline to make the same transportable, which separates in the first used clay settler 29, is utilized along with said introduced new clay to clarify and decolorize the gasoline stock to the required degree.

From clay mixer 23, the gasoline stock containing the requisite amount of decolorizing clay, passes through pipe 24 controlled by valve 25 and into the inlet side of pump 26 which discharges the same through pipe 27, controlled by valve 28, and into first used clay settler 29, wherein the clay, along with the adsorbed constituents from the treatment, is separated by gravity and utilized thereafter, as heretofore described. From first used clay settler 29, the clarified and decolorized gasoline stock passes through pipe 30, controlled by the valves 31 and 88, into the inlet side of centrifugal pump 32 wherein the same is commingled with a water solution of caustic soda coming from the caustic tank 87 through the pipe 72, the flow of caustic being controlled by operation of valves 73 and 97.

Pump 32 discharges the commingled mixture of gasoline stock and water solution of caustic soda through pipe 33, controlled by valves 34 and 34' into caustic settler 35. By means of this treatment with a water solution of caustic soda, the gasoline stock is neutralized. The products of the neutralizing action, together with any excess water solution of caustic soda, separate by gravity in the caustic settler 35 and may thereafter be utilized for further neutralizing purposes of other acid treated gasoline stock by withdrawing the same from the caustic settler 35 through the pipes 89 and 30, valves 84 and 88 being open and valve 85 being closed.

From pipe 89 the once used water solution of caustic soda passes into the inlet side of pump 32 and is therein commingled with acid treated gasoline stock along with a water solution of caustic soda coming from tank 87, as heretofore described. Thus the water solution of caustic soda may be cycled in such a manner that there is a substantial complete utilization of the water solution of caustic soda for neutralizing purposes and at intervals, or continuously, certain determined quantities of the spent water solution of caustic soda may be drawn into a waste receiver not shown, by opening valve 85, the pipe 83 leading to a waste receiver not shown.

From caustic settler 35, the neutralized gasoline stock passes through pipe 36 and into mixer 37 wherein the said neutralized gasoline stock is commingled with a water solution of hypochlorite of soda coming from the tank 86 through the pipe 74, the flow being controlled by operation of valve 75. The quantity of hypochlorite of soda employed depends to a certain extent upon the stock treated and the products desired. Preferably, we use approximately $\frac{1}{10}$ of one per cent by volume of a 8.7 degree Baumé hypochlorite of soda water solution.

From mixer 37 the commingled mixture of gasoline stock and water solution of hypochlorite of soda passes through pipe 38 and into hypo settler 39, wherein the spent water solution of hypochlorite of soda separates and is drawn off to a waste receiver not shown through the pipe 82 controlled by valve 81. From hypo settler 39 the treated gasoline stock passes into pipe 40, the flow being controlled by valve 76, and into the inlet side of pump 42. A portion of the water solution of caustic soda which separates from the gasoline stock in caustic settler 46 is introduced into the gasoline stock coming from the hypo settler 39 through the pipe 77, said flow being controlled by valve 80. In case an insufficient amount of a water solution of caustic soda is not obtained from the caustic settler 46, a further amount of water solution of caustic soda may be introduced into the gasoline stock coming from the hypo settler 39 through the pipe 72 controlled by the valves 73 and 98. The quantity of water solution of caustic soda required to treat the gasoline stock coming from the hypo settler 39 must be sufficient to render the gasoline stock alkaline. Pump 42 discharges the commingled mixture of gasoline stock and caustic soda through the pipe 43 controlled by valve 45 and into caustic settler 46 wherein the water solution of caustic soda and products of reaction separate and may be drawn into a waste receiver not shown, by opening valve 78 in the pipe 79, or a portion of the said spent caustic soda may be again re-used by opening valve 80 in the pipe 77, as heretofore described. The quantity of caustic soda employed for the treating operation ranges from approximately ½ of 1 per cent to 2 per cent of 2½ degree Bé. caustic soda water solution.

From caustic settler 46 the treated gasoline stock now substantially water white and free from all impurities passes through pipe 47 to a finished gasoline tank not shown.

The acid reaction products separated in sludge settlers 6 and 8, by the heretofore described acid treatment, still contain a considerable quantity of free sulphuric acid and are intermittently employed for treating the gasoline stock coming through pipe 1, during which interval the sulphuric acid from tank 48 is not employed. Thus, for example, the gasoline stock coming through pipe 1 is treated with sulphuric acid from tank 48 for a period of 6 hours during which interval the acid reaction products are permitted to accumulate in sludge settlers 6 and 8. After this interval of time, valve 52 in pipe 51 is closed and valves 57 in pipe 58, valve 56 in the pipe 55, valve 53 in the pipe 65 and valve 62 in the pipe 1 are opened, thereby permitting the acid reaction products from the sludge settlers 6 and 8 to flow through the pipe 54 and into the suction side of pump 3, the flow of the acid reaction products being regulated so that the gasoline stock coming through the pipe 1 will be sufficiently treated. The acid reaction products and gasoline stock entering the inlet side of pump 3, are commingled and discharged through the pipe 4 in the same manner as when sulphuric acid was employed as a treating agent. The commingled mixture of gasoline stock and acid reaction products passes from the pipe 4 into sludge settler 6 wherein a portion of the acid reaction products are separated from the gasoline stock. This operation is conducted in the same manner as the acid treatment, the sludge or acid reaction products settling in the sludge settlers 6 and 8. After a period of approximately 6 hours, the acid reaction products employed to treat the incoming untreated gasoline stock, become spent. That is, they contain substantially no free sulphuric acid, after which the acid reaction products are drawn out of the system into sludge tank 67 by opening valve 66 and closing valve 53 in the pipe 65, which permits the said acid reaction products to flow into sludge tank 67. Also, valve 63, in the pipe 64, may be opened so as to permit the sludge or acid reaction products separated by the filters 10, 12 and 14 to pass into the said sludge tank 67.

The acid reaction products, or sludge, which collects in tank 67 may be conducted to a recovery plant not shown by opening valve 69 in the pipe 68 and the acid recovered therefrom utilized for the further treatment of gasoline stock.

While the process herein described is well adapted for carrying out the objects of this invention, various modifications and changes may be made without departing from the invention, such as for example, the elimination of the filters 10, 12 and 14 and the separation of the major portion of the acid reaction products by gravity only, and the invention includes all such changes and modifications as appear within the scope of the appended claims.

What I claim is:

1. A continuous process of treating gasoline stocks, comprising, continuously commingling a gasoline stock with sulphuric acid in quantities in excess of the amount necessary to combine with the unstable hydrocarbons and unstable sulphur bearing hydrocarbons contained therein, continually separating and collecting the major portion of the acid reaction products mixed with the said excess sulphuric acid as produced, for a period of time, then using the collected acid reaction products containing the excess sulphuric acid by the same method for the further continuous treatment of untreated gasoline stock from the same source of supply without the introduction of sulphuric acid for a second period of time until substantially all the sulphuric acid contained by the said collected acid reaction products has been utilized for treating gasoline stock; continuously completing the purification of the acid treated gasoline stock as produced during said periods of time, by treating the same continuously with a spent clarifying and decolorizing clay subsequently employed to clarify and decolorize the treated gasoline stock, to remove the remaining acid reaction products therefrom, then clarifying and decolorizing the said treated gasoline stock free from acid reaction products, with a clarifying and decolorizing clay, then neutralizing the gasoline stock with a water solution of caustic soda and finally rendering the gasoline stock "sweet" to the "doctor test" by treating the same with a water solution of hypochlorite of soda.

2. A continuous process of treating gasoline stocks as in claim 1, in which the once used water solution of caustic soda is re-used in conjunction with an unused water solution of caustic soda.

3. A continuous process of treating gasoline stocks as in claim 1, in which the once used clarifying and decolorizing clay is re-used along with the unused clarifying and decolorizing clay to clarify and decolorize the treated gasoline stock.

4. A continuous process of treating petroleum oils, comprising, treating a petroleum oil with sulphuric acid to remove the unstable hydrocarbons and the unstable sulphur bearing hydrocarbons contained therein, separating the major portion of the acid reaction products by gravity settling and filtration operations, separating the remaining portion of the acid reaction products from the acid treated petroleum oil by treating the same with a part of the spent clarifying and decolorizing clay subsequently employed to clarify and decolorize the treated petroleum oil, then clarifying and decolorizing the said treated petroleum oil free from acid reaction products with a clarifying and decolorizing clay, then neutralizing the petroleum oil with a water solution of caustic soda and finally rendering the petroleum oil "sweet" to the "doctor test" by treatment with a water solution of hypochlorite of soda.

5. A continuous process of treating gasoline stocks as in claim 4, in which the once used water solution of caustic soda is re-used in conjunction with an unused water solution of caustic soda.

6. A continuous process of treating gasoline stock as in claim 4, in which the once used clarifying and decolorizing clay is re-used along with the unused clarifying and decolorizing clay to clarify and decolorize treated gasoline stock.

In testimony whereof I affix my signature.

GUY C. ROWDEN.